Patented Apr. 20, 1954

2,676,182

UNITED STATES PATENT OFFICE 2,676,182

COPOLYMERIC SILOXANES AND METHODS OF PREPARING THEM

William Herbert Daudt and Leslie Junior Tyler, Midland, Mich., assignors to Dow Corning Corporation, Midland, Mich., a corporation of Michigan No Drawing. Application September 13, 1950, Serial No. 184,720

3 Claims. (Cl. 260—448.2)

This invention relates to copolymeric siloxanes containing $SiO_2$.

In the commercial preparation of copolymeric siloxanes, particularly siloxane resins, the heretofore employed procedure has generally been to cohydrolyze and cocondense various hydrolyzable silanes. In those copolymers containing unsubstituted silicon it has been heretofore necessary to employ a special procedure in order to obviate excessive gel formation. This gel formation is undesirable since the gels themselves are not usable. Heretofore, in commercial operations, the only practicable procedure for incorporating unsubstituted silicon in a siloxane resin has been that of employing either tetraalkoxysilanes or an alcohol hydrolysis medium which is equivalent to employing a tetraalkoxysilane.

The applicants have found that unexpectedly beneficial materials are obtained when silanes or siloxanes are reacted with a silica hydrosol. It has been found unexpectedly that not only does the method produce materials which are completely soluble in organic solvents such as toluene, but also that the copolymers so formed are superior in many respects to copolymers produced by the cohydrolysis of organo silanes with silicon tetrachloride or ethyl orthosilicate.

It is an object of this invention to provide a commercially feasible method for preparing siloxane copolymers containing $SiO_2$ which is more economical than heretofore known procedures. Another object is to prepare improved organosiloxane copolymers which are superior to those which are prepared by the cohydrolysis of hydrolyzable silanes. Other objects and advantages will be apparent from the following description.

In accordance with this invention an organosilicon composition composed of compounds of the group $R_nSiX_{4-n}$ and

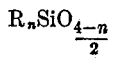

where R is alkyl, monocyclic aryl hydrocarbon, and halogenated monocyclic aryl hydrocarbon, X is chlorine or alkoxy, and $n$ has a value from 1 to 3, the average degree of substitution of said composition being from 2.1 to 3 R groups per silicon atom and at least 50 per cent of the R groups being alkyl is reacted with a silica hydrosol having a pH of less than 5, in amount such that there is at least one mol of organosilyl groups per mol of $SiO_2$ in the silica hydrosol.

It has been found that reaction between silica hydrosols, silanes and/or siloxanes proceeds rapidly at 30° C. or above to produce copolymeric siloxanes. During the reaction the mixture is preferably thoroughly agitated. In general, an emulsion forms which separates into two layers upon standing. The layers are then separated and the organosilicon layer washed free of acid and dried. The products thereby obtained range from viscous oils to thermoplastic resins, depending upon the size of the organic groups and the ratio of organosilyl groups to silica.

If desired, water-miscible solvents may be employed in order to increase the rate of the reaction. Suitable solvents include fatty alcohols, dioxane, ketones, and water-soluble carboxylic acids. At times it is advisable to employ combinations of water-soluble and water-insoluble solvents such as toluene, xylene, and ether. The presence of a solvent is not necessary to the reaction.

The organosilicon compounds which are employed in this invention are silanes of the formula $R_nSiX_{4-n}$ and siloxanes of the formula

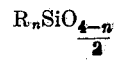

or combinations thereof. In order to obtain the desirable benefits of this invention, the organosilicon composition should be employed in amount sufficient that there is at least a total of one mol of organosilyl groups per mol of $SiO_2$ in the silica hydrosol. Preferably, the amount of silane employed is at least 3 mols per mol of $SiO_2$. If less than an equimolar ratio is used, the product obtained is undesirable. However, it has been found that any amount of silane in excess of a 1 to 1 molar ratio may be employed without deleteriously affecting the reaction.

The silanes and siloxanes which are within the scope of this invention and which are operative therein are those in which the R groups are alkyl, monocyclic aryl hydrocarbon, or halogenated monocyclic aryl hydrocarbon. At least 50 per cent of the total number of R groups are alkyl. The hydrolyzable radicals on the silanes are chlorine or alkoxy radicals.

The silanes and siloxanes may be employed individually or in mixture. In those cases in which chlorosilanes are employed it is unnecessary to add any acid to the reaction mixture, since HCl will be formed in situ. In such cases the chlorosilane may be added directly to a sodium silicate solution. In cases where alkoxy silanes and siloxanes are employed it is necessary that the silica hydrosol contain sufficient acid so that the pH thereof shall be less than 5. Suitable acids are hydrochloric, sulfuric, nitric, phosphoric, benzenesulphonic, trichloroacetic, and any other strong acid. Any amount of acid in excess of that necessary to produce a pH of less than 5 may be employed.

It is to be understood that any combination of any of the above organosilicon compounds can be employed, provided the degree of substitution of the mixture is between 2.1 and 3. Thus, the organosilicon composition is $R_3SiCl$, $R_3SiOR$, or $(R_3Si)_2O$, either alone or in combination or together with limited amounts of $R_2SiX_2$, $RSiX_3$, $R_2SiO$, and $RSiO_{3/2}$. Specific examples of individual compounds which are within the purview of this invention are trimethylchlorosilane, trimethylethoxysilane, trimethylisopropoxysilane, phenyldimethylchlorosilane, hexamethyldisiloxane, dimethylsiloxane, phenyltrichlorosilane, diethyltetramethyldisiloxane, tolylmethyldichlorosilane, methyltriethoxysilane, stearyltrichlorosilane, chlorophenyldimethylchlorosilane, monotolylsiloxane, and trifluorotolylmethyldichlorosilane.

The silica sols employed herein may be prepared in the usual manner, by neutralizing sodium silicate solution. As has been pointed out, this neutralization may be accomplished either by employing an acid or a chlorosilane. In the latter case, it is not necessary to add any additional acid to the reaction mixture. Whereas the silica sol of any concentration would react with the above defined organosilicon compounds under acid conditions, it is preferred for the purposes of this invention that the sol have a concentration of from 1 to 35 per cent by weight $SiO_2$.

Under the above conditions, reaction between the organosilicon compounds and the silica of the hydrosol takes place to produce copolymers in which organosilyl groups are linked to the silicon of the $SiO_2$ through oxygen atoms. The copolymers are uniquely useful for water-proofing applications, for anti-flotation of paint pigments, and for thickening dimethylsiloxane fluids. The present method makes possible the production of siloxane copolymers at a greatly reduced cost over the heretofore employed cohydrolytic method.

The following examples are illustrative only of the invention and should not be construed as limiting the scope thereof, which is particularly delineated in the appended claims.

Example 1

The silica sols employed in the following examples were all prepared from a sodium silicate solution containing 26.7 per cent by weight $SiO_2$ and 8.2 per cent by weight $Na_2O$ and having the empirical formula $Na_2O \cdot 3.6SiO_2$. The specific gravity of the solution was 1.365.

90.5 ml. of the above sodium silicate solution was diluted with 500 ml. of water, and 45 ml. of trimethylchlorosilane was added all at once to neutralize the sodium. An additional 115 ml. of trimethylchlorosilane was added portion-wise with agitation. A thick emulsion was obtained which coagulated to give a powdery material. The mixture was filtered and the powder was washed until neutral, dried, and extracted with chloroform. There was obtained a soluble fraction which melted at 140° C. to 160° C. and had a methyl to silicon ratio of 1.48. After extraction, an insoluble portion remained which had a methyl to silicon ratio of 1.13.

Example 2

25 ml. of the above sodium silicate solution was diluted with 50 ml. of water and then added to 25 ml. of concentrated HCl to give an acidic sol containing .09 g. of $SiO_2$ per ml. 50 ml. of the acid sol was diluted with 25 ml. of ethanol and there was added thereto all at once 25 ml. of dimethylphenylchlorosilane. The mixture was agitated and a temperature rise was noted. The mixture formed an emulsion which separated into an oily precipitate and an aqueous phase. The oily precipitate was filtered, washed with water, and extracted with hot alcohol. The extract was concentrated to give a viscous soluble material which softened upon warming, and which was a copolymer of phenyldimethylsiloxane and $SiO_2$.

Example 3

The standard sodium silicate solution of Example 1 was diluted with 250 ml. of water, and 125 ml. of HCl was added thereto. To the acid silica sol was added a mixture of 1000 ml. hexamethyldisiloxane and 250 ml. of ethanol. The entire mixture was thoroughly agitated and after ten minutes an emulsion formed. The emulsion soon separated into an organic phase and an aqueous phase. The two layers were separated and the organic layer was washed with water until neutral and dried over calcium chloride. The alcohol and excess hexamethyldisiloxane were removed to give a white, friable, powdery resin. This material was completely soluble in solvents such as toluene and xylene. It was a copolymer of trimethylsiloxane and $SiO_2$.

Example 4

A silica hydrosol containing 0.18 g. of $SiO_2$ per ml. was prepared by treating 50 ml. of the sodium silicate solution of Example 1 with 25 ml. of water and 25 ml. of concentrated HCl. 100 ml. of the sol was mixed with 50 ml. of ethanol and 50 ml. of trimethylethoxysilane. The mixture was shaken intermittently for an hour. There was a rise in temperature and an emulsion formed which separated to give two clear layers. The organic layer was washed until neutral and the solvent was removed to give a soluble, thermoplastic resin which was a copolymer of trimethylsiloxane and $SiO_2$.

Example 5

100 ml. of ethyldimethylchlorosilane was hydrolyzed by shaking with 500 ml. of water. The hydrolyzate was added to 100 ml. of an acid silica hydrosol having a density of .18 g. of $SiO_2$ per ml. and 250 ml. of ethanol. The hydrosol was prepared as shown in Example 4. The mixture was agitated and an emulsion formed which broke to give two clear phases. The organic phase was washed until neutral, and upon removal of the solvent a soluble, white, powdery material was obtained. This was a copolymer of ethyldimethylsiloxane and $SiO_2$.

Example 6

100 ml. of an acid silica hydrosol having .18 g. of $SiO_2$ per ml. was prepared as shown in Example 4. The sol was diluted with 50 ml. of ethanol and mixed with 25 ml. of hexamethyldisiloxane and 25 ml. of cyclic dimethylsiloxane. The mixture was agitated, whereupon an emulsion formed which separated into two layers. The organic layer was washed with water until neutral and the solvent was removed therefrom to give a solid, friable material which was soluble in organic solvents such as toluene, and was a copolymer of trimethylsiloxane, dimethylsiloxane, and $SiO_2$.

Example 7

A silica hydrosol containing .18 g. of SiO₂ per ml. was prepared in accordance with the method of Example 4. 300 ml. of the acid sol was diluted with 150 ml. of ethanol and cooled to 10° C. The sol was added to 100 ml. of toluene and stirred vigorously during 10 minutes while a mixture of 100 g. of trimethylchlorosilane and 50 g. of phenyltrichlorosilane was added. An emulsion formed and the mixture became quite warm. The mixture was stirred for two hours and then allowed to stand overnight. The upper layer which separated was removed, washed neutral, and the solvent was evaporated. There was obtained a clear viscous fluid which was a copolymer of trimethylsiloxane, monophenylsiloxane, and SiO₂.

Example 8

When the silica sol of Example 7 is reacted with trimethylchlorosilane and stearyltrichlorosilane in the manner and proportions shown in that example, a viscous fluid which is a copolymer of trimethylsiloxane, monostearylsiloxane, and SiO₂ is obtained.

Example 9

100 ml. of a silica hydrosol having .18 g. of SiO₂ per ml. was prepared in accordance with Example 4 and was diluted with 100 ml. of ethanol and mixed with 50 ml. of bischlorophenyltetramethyldisiloxane. The mixture was agitated, whereupon an emulsion formed which separated into two layers. The organic layer was washed with water until neutral, and upon removal of the solvent a copolymeric siloxane containing chlorophenyldimethylsiloxane and SiO₂ was obtained.

That which is claimed is:

1. A method of preparing copolymeric siloxanes which comprises reacting an organo silicon composition composed of compounds selected from the group consisting of $R_nSiX_{4-n}$ and $$R_nSiO_{\frac{4-n}{2}}$$

where R is selected from the group consisting of alkyl, monocyclic aryl hydrocarbon, and halogenated monocyclic aryl hydrocarbon radicals, X is selected from the group consisting of chlorine and alkoxy radicals, and $n$ has a value from 1 to 3, the average degree of substitution of said composition being from 2.1 to 3 R groups per silicon atom, and at least 50 per cent of the R groups being alkyl, with a silica hydrosol having a pH of less than 5 in amount such that there is at least one mol of organosilyl groups per mol of SiO₂ in the silica hydrosol, said silica hydrosol having been prepared by reacting a water-soluble alkali metal silicate with an acid.

2. The method in accordance with claim 1 wherein the concentration of the hydrosol is from 1 to 35 per cent by weight SiO₂.

3. A method of preparing copolymeric siloxanes which comprises reacting a methyl silicon composition selected from the group consisting of $(CH_3)_nSiX_{4-n}$ and $$(CH_3)_nSiO_{\frac{4-n}{2}}$$

where X is selected from the group consisting of chlorine and alkoxy radicals and $n$ has a value from 1 to 3, there being on the average from 2.1 to 3 methyl groups per silicon atom, with a silica hydrosol having a pH of less than 5 and a concentration of from 1 to 35 per cent by weight SiO₂, said methyl silicon composition being employed in amount such that there is at least one mol of the methyl silyl groups per mol of SiO₂ in the silica hydrosol, said silica hydrosol having been prepared by reacting a water-soluble alkali metal silicate with an acid.

References Cited in the file of this patent

UNITED STATES PATENTS

| Number | Name | Date |
|---|---|---|
| 2,441,320 | Hyde | May 11, 1948 |
| 2,441,422 | Krieble et al. | May 11, 1948 |
| 2,458,944 | Hyde | Jan. 11, 1949 |
| 2,486,162 | Hyde | Oct. 25, 1949 |
| 2,521,390 | Meadowcroft | Sept. 5, 1950 |
| 2,562,953 | Rust et al. | Aug. 7, 1951 |

OTHER REFERENCES

Shaw et al., The Industrial Chemist, March 1945, pp. 130 to 135.